(12) United States Patent
Li

(10) Patent No.: US 9,531,734 B2
(45) Date of Patent: Dec. 27, 2016

(54) METHOD AND APPARATUS FOR INTERCEPTING OR CLEANING-UP PLUGINS

(71) Applicant: TENCENT TECHNOLOGY (SHENZHEN) COMPANY LIMITED, Guangdong (CN)

(72) Inventor: Weijie Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/607,044

(22) Filed: Jan. 27, 2015

(65) Prior Publication Data
US 2015/0150128 A1 May 28, 2015

Related U.S. Application Data

(63) Continuation of application No. PCT/CN2013/079482, filed on Jul. 16, 2013.

(30) Foreign Application Priority Data

Jul. 27, 2012 (CN) .......................... 2012 1 0264230

(51) Int. Cl.
*H04L 29/06* (2006.01)
*G06F 9/445* (2006.01)
*G06F 11/34* (2006.01)

(52) U.S. Cl.
CPC .......... *H04L 63/14* (2013.01); *G06F 9/44526* (2013.01); *G06F 11/3409* (2013.01); *G06F 2201/865* (2013.01)

(58) Field of Classification Search
CPC .. H04L 63/14; G06F 9/44526; G06F 11/3409; G06F 2201/865
(Continued)

(56) References Cited

U.S. PATENT DOCUMENTS 6,825,941 B1 * 11/2004 Nguyen ................ G06F 3/1227
358/1.13
6,871,345 B1 * 3/2005 Crow ........................ G06F 8/67
709/203
(Continued)

FOREIGN PATENT DOCUMENTS

| CN | 101291305 | 10/2008 |
|---|---|---|
| CN | 101727380 | 6/2010 |
| CN | 102831021 | 12/2012 |

OTHER PUBLICATIONS

International Search Report and Written Opinion for PCT Application No. PCT/CN2013/079482 dated Jan. 27, 2015, 9 pages.

*Primary Examiner* — Matthew Henning
(74) *Attorney, Agent, or Firm* — Anova Law Group, PLLC

(57) ABSTRACT

The present invention discloses a method and apparatus for intercepting or cleaning-up plugins. The methods may include: obtaining performance attributes of a plugin; determining if the plugin meets a performance criterion based on the obtained performance attributes and empirical data; and intercepting or cleaning-up the plugin if the plugin does not meet the performance criterion. In accordance with embodiments of the present invention, the performance attributes of a plugin can be evaluated to determine whether the plugin meets a preset performance criterion, and the plugin can then be processed according to the result of the determination.

19 Claims, 12 Drawing Sheets

(58) Field of Classification Search
USPC .......................................................... 726/22
See application file for complete search history.

(56) References Cited

U.S. PATENT DOCUMENTS

| 8,250,228 B1* | 8/2012 | Johansson ................. G06F 9/46 709/231 |
| 2010/0251034 A1 | 9/2010 | Zhang et al. |

\* cited by examiner

METHOD AND APPARATUS FOR INTERCEPTING OR CLEANING-UP PLUGINS

CROSS-REFERENCE TO RELATED APPLICATIONS

This application is a continuation of International Patent Application No. PCT/CN2013/079482, entitled "Method and Apparatus for Intercepting or Cleaning-up Plugins," filed on Jul. 16, 2013, which claims the benefit and priority of Chinese Patent Application No. 201210264230.X, entitled "Method and Apparatus for Intercepting or Cleaning-up Plugins," filed on Jul. 27, 2012. The entire disclosures of each of the above applications are incorporated herein by reference.

TECHNICAL FIELD

The present invention relates to plugin detection technologies, and more particularly to a method and apparatus for intercepting or cleaning-up plugins.

BACKGROUND

In the prior art, plugin interception or cleanup is generally based on the malicious acts or reputations of the plugins. For example, malicious plugin like Adware or Spyware monitors the internet activities of user terminals, and sends the recorded data to a remote monitoring center for the purposes of advertising or stealing game or bank account passwords, which causes severe adverse effects on user terminals.

However, some plugins are not malicious, have some useful functions, but may consume large amount of resources at the user terminal when they are running Such plugins are usually not blocked or cleaned-up by security software, and are not easily found by the user terminal.

Since the current security software only blocks or cleans-up plugin based on maliciousness, it may miss some plugins, which could affect the stability of the user terminal system.

SUMMARY OF THE INVENTION

The present invention aims to provide a method for intercepting or cleaning-up plugins to ensure a more complete interception and cleanup of the plugins, and enhances the stability of the system.

In accordance with embodiments of the present invention, a method for intercepting or cleaning-up a plugin is provided, the method comprising: obtaining performance attributes of a plugin; determining whether the plugin meets a performance criterion based on the performance attributes and empirical data; and intercepting or cleaning-up the plugin if the plugin does not meet the performance criterion.

Preferably, the method further comprises monitoring activity of the plugin in a user terminal, wherein the activity is selected from a group comprising installing, loading, and running of the plugin; identifying the plugin based on the monitored activity; and obtaining performance attributes of the plugin when the plugin is identified.

Preferably, the method further comprises, after identifying the plugin based on the monitored activity, evaluating performance attributes of the plugin when the plugin is not identified; determining whether the plugin meets a performance criterion based on the performance attributes and empirical data; and intercepting or cleaning-up the plugin if the plugin does not meet the performance criterion.

Preferably, the method further comprises, prior to obtaining performance attributes of the plugin, obtaining empirical data of the plugin, wherein the empirical data comprises plugin importance data, plugin performance data, and/or end user review data; and determining whether the plugin meets the performance criterion based on the empirical data.

Preferably, the empirical data obtained through plugin testing, backend collection, and/or web crawling, backend collection comprises frontend collection and end user review, frontend collection comprises hook mode and notification mode, plug testing comprises testing the plugin in an automatic module to obtain information on the plugin's CPU usage, load time and/or memory usage; hook mode comprises using a hook to obtain a start time and an end time for loading the plugin, a start time and an end time for running the plugin, and information on the plug's CPU usage and/or memory usage while the plugin is loading and running; reception mode comprises a client directly notifying starting and ending of loading and running of the plugin; end user review comprises collecting reviews of end users on the performance of the plugin; web crawling comprises crawling search engine data and/or website review data to evaluate the performance of the plugin; and the empirical data is stored in a remote cloud database or a local database.

Preferably, determining if the plugin meets the performance criterion based on the performance attributes and empirical data comprises: matching the performance attributes with empirical data stored on a cloud database; obtaining a preset determination result after a successful match, and determining whether the plugin meets the performance criterion based on the preset determination result.

In accordance with embodiments of the present invention, an apparatus for intercepting or cleaning-up a plugin is provided, the apparatus comprising: a performance acquisition module for obtaining performance attributes of a plugin; a first performance determination module for determining whether the plugin meets a performance criterion based on the performance attributes and empirical data; and a plugin processing module for intercepting or cleaning-up the plugin if the plugin does not meet the performance criterion.

Preferably, the apparatus further comprises a plugin monitoring module for monitoring activity of the plugin in a user terminal, wherein the activity is selected from a group comprising installing, loading, and running of the plugin; identifying the plugin based on the monitored activity; and obtaining performance attributes of the plugin when the plugin is identified.

Preferably, the apparatus further comprises a performance evaluation module for, after identifying the plugin based on the monitored activity, evaluating performance attributes of the plugin when the plugin is not identified; wherein the first performance determination module is configured for determining whether the plugin meets a performance criterion based on the performance attributes and empirical data; and the plugin processing module is configured for intercepting or cleaning-up the plugin if the plugin does not meet the performance criterion.

Preferably, the apparatus further comprises an empirical data acquisition module for obtaining empirical data of the plugin, wherein the empirical data comprises plugin importance data, plugin performance data, and/or end user review data; and a second performance determination module for determining whether the plugin meets a performance criterion based on the empirical data.

Preferably, the empirical data obtained through plugin testing, backend collection, and/or web crawling, wherein backend collection comprises frontend collection and end user review, frontend collection comprises hook mode and notification mode, plug testing comprises testing the plugin in an automatic module to obtain information on the plugin's CPU usage, load time and/or memory usage; hook mode comprises using a hook to obtain a start time and an end time for loading the plugin, a start time and an end time for running the plugin, and information on the plug's CPU usage and/or memory usage while the plugin is loading and running; reception mode comprises a client directly notifying starting and ending of loading and running of the plugin; end user review comprises collecting reviews of end users on the performance of the plugin; web crawling comprises crawling search engine data and/or website review data to evaluate the performance of the plugin; and the empirical data is stored in a remote cloud database or a local database.

Preferably, the first performance determination module is further configured for: matching the performance attributes with empirical data stored on a cloud database; obtaining a preset determination result after a successful match, and determining whether the plugin meets the performance criterion based on the preset determination result.

In accordance with embodiments of the present invention, the performance attributes of a plugin can be evaluated to determine whether the plugin meets a preset performance criterion, and the plugin can then be processed according to the result of the determination. The embodiments of the present invention are primarily directed to evaluate and process plugins that are being installed, loaded, or running: if the plugin does meet the performance criterion, it will be intercepted if being installed, and cleaned-up if being loaded or running.

Figure 1:
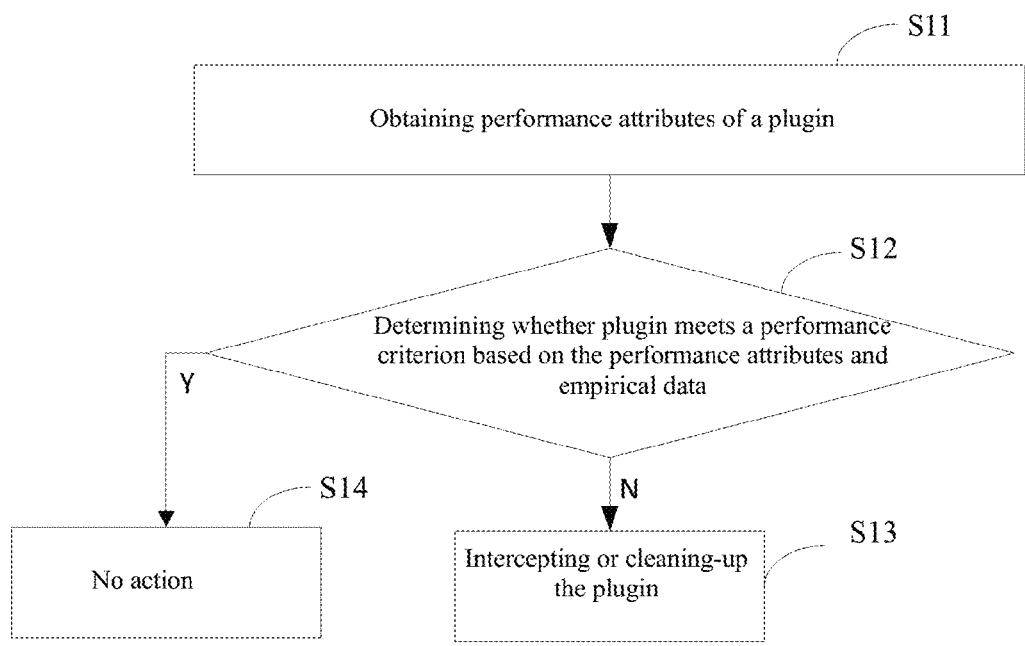
FIG. 1 is an exemplary flowchart for a method for intercepting or cleaning-up plugins in accordance with an embodiment of the present invention.

To better illustrate the technical features of the embodiments of the present invention, various embodiments of the present invention will be briefly described in conjunction with the accompanying drawings.

DESCRIPTION OF THE PREFERRED EMBODIMENTS

It should be noted that the various embodiments are merely provided to illustrate the present invention, and are not intended to limit the scope of the present invention.

Plugins are common in computer software, and are supported by many types of software. For example, text editor software Ultra Edit and software development tool Visual Studio both support plugins. There are also plugins for browsers, which comes in different forms, such as browser helper object (BHO), ActiveX, Url SearchHook, and ToolBar.

BHO: Browser Helper Objects (BHOs) are applets that automatically run whenever an Internet browser (such as IE) starts. Usually, a BHO file is installed into the user terminal systems by some other software. For example, some Adware with downloading capability may install a BHO file to track the various advertisements while the user terminal surfs the web. BHO usually makes it easier for user terminals to browse the Internet or use various accessory functions, but some BHOs are Adware or Spyware as which monitor the online behavior of user terminals and transmit recorded data to the creator of the BHO. BHO may also create conflicts with other programs that are running, and causes various display and running-time errors that may prevents the normal browsing.

ActiveX: ActiveX plugins, also known as OLE controls or OCX controls, are software components or objects that can be inserted into a webpage or other applications. Typical software needs to be separately downloaded by a user terminal before being installed, while ActiveX plugins will be automatically downloaded by the browser when the user navigates to a particular webpage, and the user will be prompted to install them. ActiveX plug-ins must be downloaded first, authenticated, and eventually confirmed by the user terminal before they can be installed. A webpage embedded with ActiveX scripts may become very slow, or may even freeze the browser.

Url SearchHook: when a user terminal enters a non-standard Web address in the address bar, such as English characters or Chinese characters, that cannot be successfully interpreted by the address bar, the browser will automatically open a page containing the search result where the string entered by the user is used as the search term, which may help the user to find the needed contents. Url SearchHook object is the plugin that completes such search, usually developed by a third-party company or individual, and installed on the browser as a plugin to help the user to better use the Internet. For example, if the user terminal enters "mobile phone" in the address bar, the search results for "mobile phone" will directly appear. Some companies or individuals may modify a browser's Url SearchHook without the knowledge of the user terminal in order to direct traffic to a particular website or for other commercial purposes.

Toolbar usually refers to accessory tools loaded in a browser, located below the standard browser toolbar. In Internet Explorer, one can right click the blank space in the toolbar to check the installed toolbars, and to display or hide the installed toolbars by making the corresponding selections.

The plugins in accordance with embodiments of the present invention are programs written accordance to certain standard application programming interfaces. For example, after being installed, browser plugins can be called directly by the browser. The plugin can also be a component for certain software features, which can facilitate or impede the user's use of the software. Performance refers to the specification parameters of a computer, such as speed, which is an important indicator of computer performance. The performance of a computer can typically be evaluated by the CPU usage and the time it takes to complete a task. Inception refers to stopping the installation or loading of a plugin. Clean-up refers to the removal of the plugin from the computer.

Windows-NT-family Host Intrusion Prevention System (WinHIPS) is a kernel driver which uses techniques such as filtering and system call hooking to implement intelligence interception and safeguard computer systems.

As shown in FIG. 1, in accordance with an embodiment of the present invention, a method for intercepting or cleaning-up a plugin is provided, the method comprising:

Step 11: obtaining performance attributes of a plugin;

Step 12: determining whether the plugin meets a performance criterion based on the performance attributes and empirical data. If the plugin does not meet the performance criterion, proceed to Step 13; if the plugin meets the performance criterion, proceed to Step 14.

Step 13: intercepting or cleaning-up the plugin;

Step 14: no action taken.

In accordance with the method for intercepting or cleaning-up a plugin, the performance attributes of a plugin can be evaluated to determine whether the plugin meets a preset performance criterion, and the plugin can then be processed according to the result of the determination. This embodiment of the present invention is primarily directed to evaluating and processing plugins that are being installed, loaded, or running: if the plugin does meet the performance criterion, it will be intercepted if being installed, and cleaned-up if being loaded or running; if the plugin meets the performance criterion, no action is taken.

Figure 2:
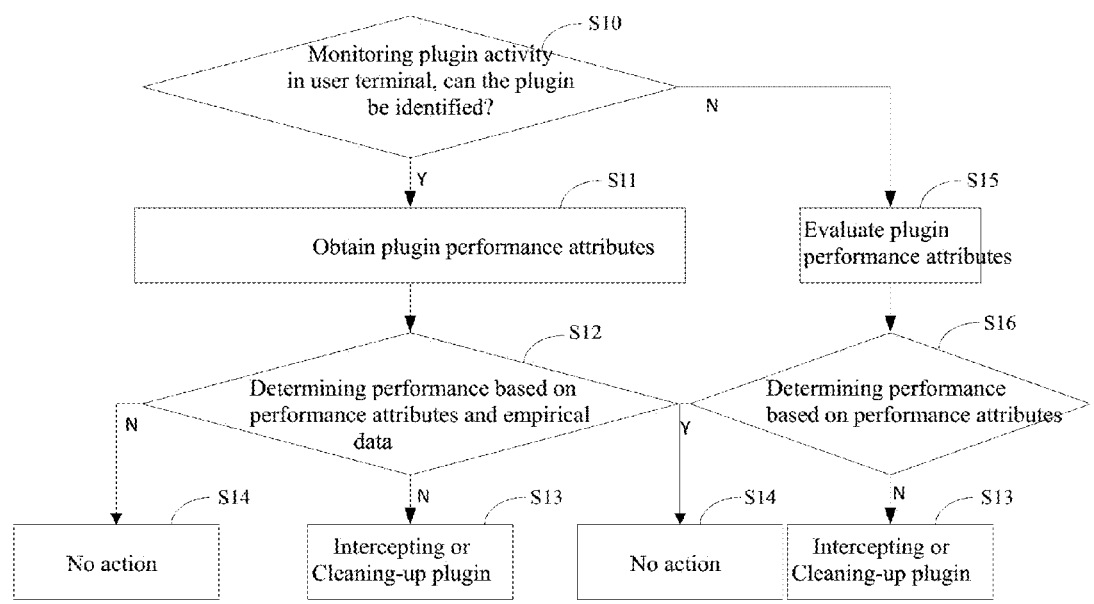
FIG. 2 is an exemplary flowchart for a method for intercepting or cleaning-up plugins in accordance with another embodiment of the present invention.

As shown in FIG. 2, in accordance with another embodiment of the present invention, the method further comprises, prior to the above method, Step 10: monitoring activity of the plugin in a user terminal, wherein the activity is selected from a group comprising installing, loading, and running of the plugin; identifying the plugin based on the monitored activity; if the plugin is identified, proceeds to step 11; if the plug is not identified, proceeds to step 15.

Step 15: evaluating performance attributes of the plugin when the plugin is not identified;

Step 16: determining whether the plugin meets a performance criterion based on the performance attributes and empirical data. If the plugin does not meet the performance criterion, proceed to Step 13; if the plugin meets the performance criterion, proceed to Step 14.

Figure 3:
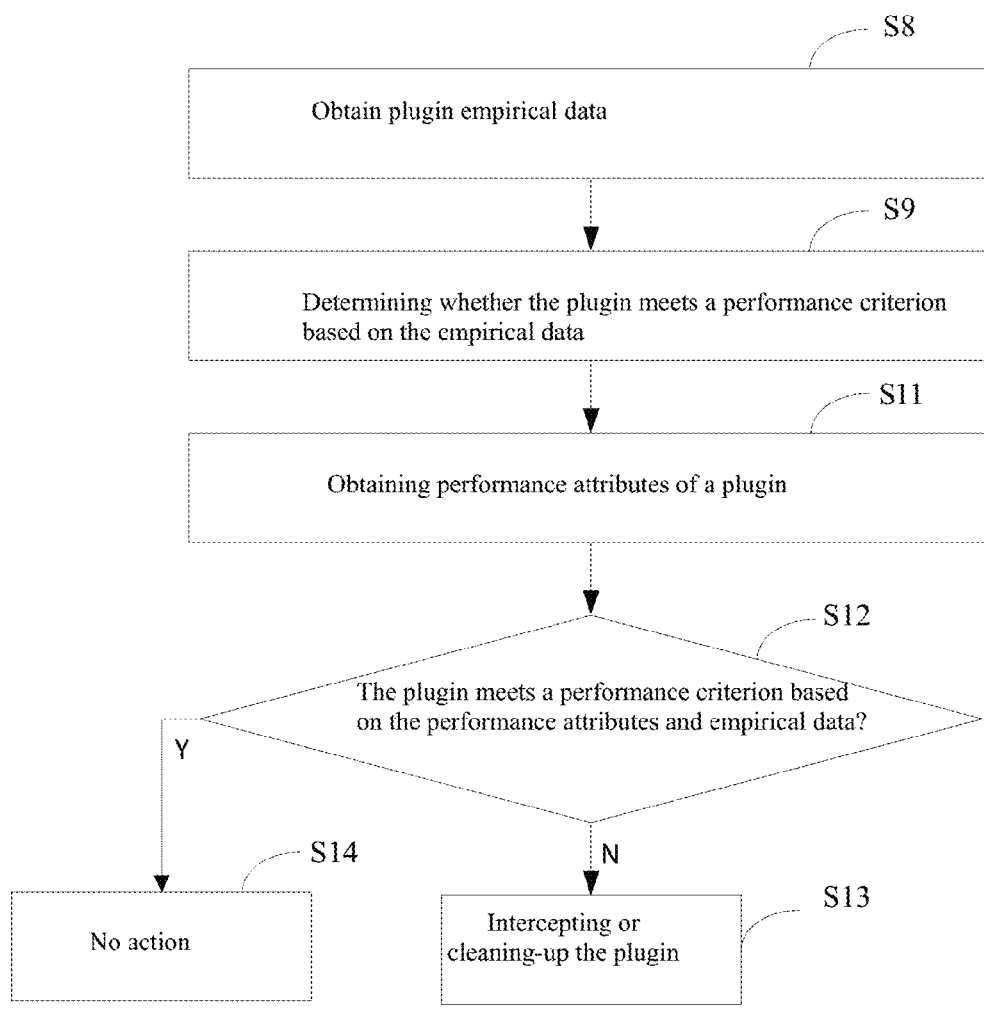
FIG. 3 is an exemplary flowchart for a method for intercepting or cleaning-up plugins in accordance with yet another embodiment of the present invention.

As shown in FIG. 3, in accordance with another embodiment of the present invention, the method further comprises, prior to Step 10:

Step 8: obtaining empirical data of the plugin, wherein the empirical data comprises plugin importance data, plugin performance data, and/or end user review data; and Step 9: determining whether the plugin meets a performance criterion based on the empirical data.

Figure 4:
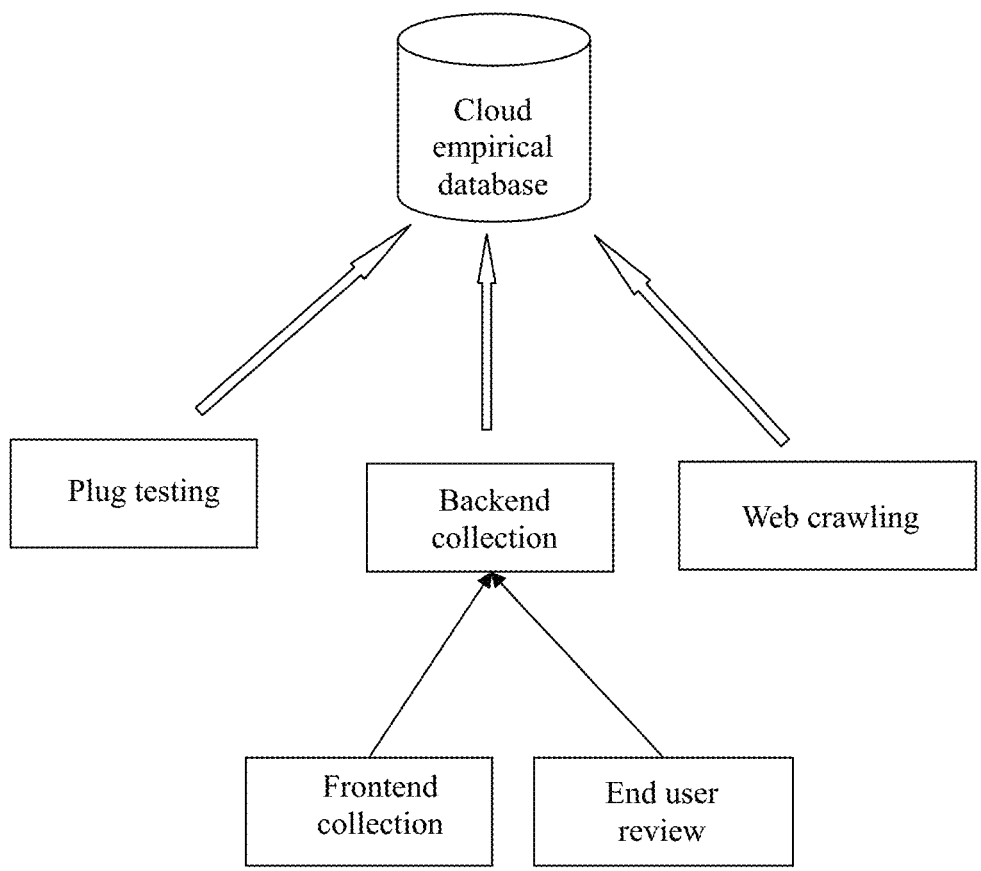
FIG. 4 is an exemplary flowchart for acquiring empirical data in accordance with an embodiment of the present invention.

As shown in FIG. 4, the empirical data can be obtained through plugin testing, backend collection, and/or web crawling, backend collection comprises frontend collection and end user review, frontend collection comprises hook mode and notification mode, the empirical data is stored in a remote cloud database or a local database. The cloud database is located at the server and can be used to store empirical data, and can communicate with the client over the network. The local database is located locally at the client and can be used to store empirical data.

Further, plug testing comprises testing the plugin in an automatic module to obtain information on the plugin's CPU usage, load time and/or memory usage.

Frontend collection can be implemented through a client, and includes hook mode and notification mode.

1. Hook mode: using a hook to obtain a start time and an end time for loading the plugin, a start time and an end time for running the plugin, and information on the plug's CPU usage and/or memory usage while the plugin is loading and running;

2. Reception mode: a client directly notifying starting and ending of loading and running of the plugin.

Frontend collection includes collection hardware and software environment to further evaluate performance data.

End user review includes collecting reviews of end users on the performance of the plugin, which can be placed in the plugin cleanup module of security software, or plugin monitoring modules, or any other places.

Web crawling includes crawling search engine data and/or website review data to evaluate the performance of the plugin.

In constructing the cloud database for empirical data, one factor that should be considered is the necessity of the plugin. For example, plugins like the Flash are highly necessary, and should be loaded even if its performance is poorer than other plugins, and the performance attributes of such plugins should be directly set as meeting the criterion. The factors to be considered regarding whether or not a plugin meets the performance criterion include but are not limited to plugins necessity or importance data, end user plugin performance review data; plugin performance testing data, frontend collected performance data, and relevant performance data on the Internet. For example, a plugin with long loading time, poor end user review and not particularly important can be set as not meeting the performance criterion.

Figure 5:
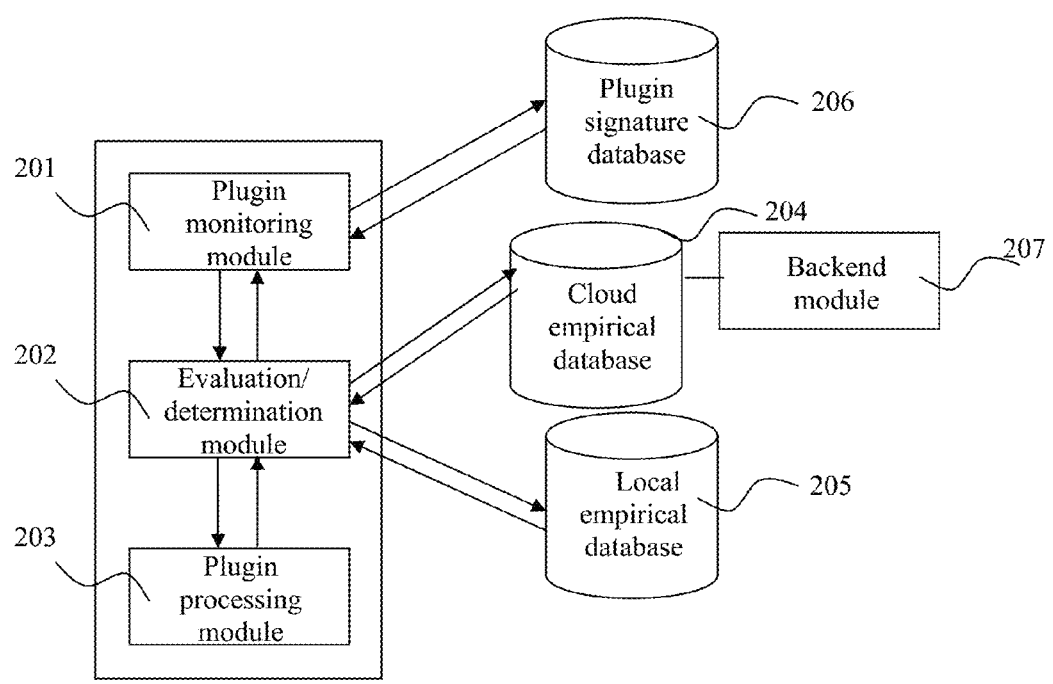
FIG. 5 is an exemplary schematic diagram for relevant components for acquiring empirical data in accordance with an embodiment of the present invention.

The method for intercepting or cleaning-up a plugin can be implemented in a client and a server, and the client can include a performance acquisition module 201, an evaluation/determination module 202 and a plugin processing module 203. The method can also be implemented in a plugin signature database 206 and a local empirical database 205. The server can include backend module 207. The method can also be implemented in cloud empirical data database 204 as shown in FIG. 5. The performance acquisition module 201, evaluation/determination module 202 and plugin processing module 203 generally can be one or several independent installation files based on the needs, and whose functionalities can be implemented as either Dynamic Link Library (DLL) or Label Information Base (LIB).

Figure 6:
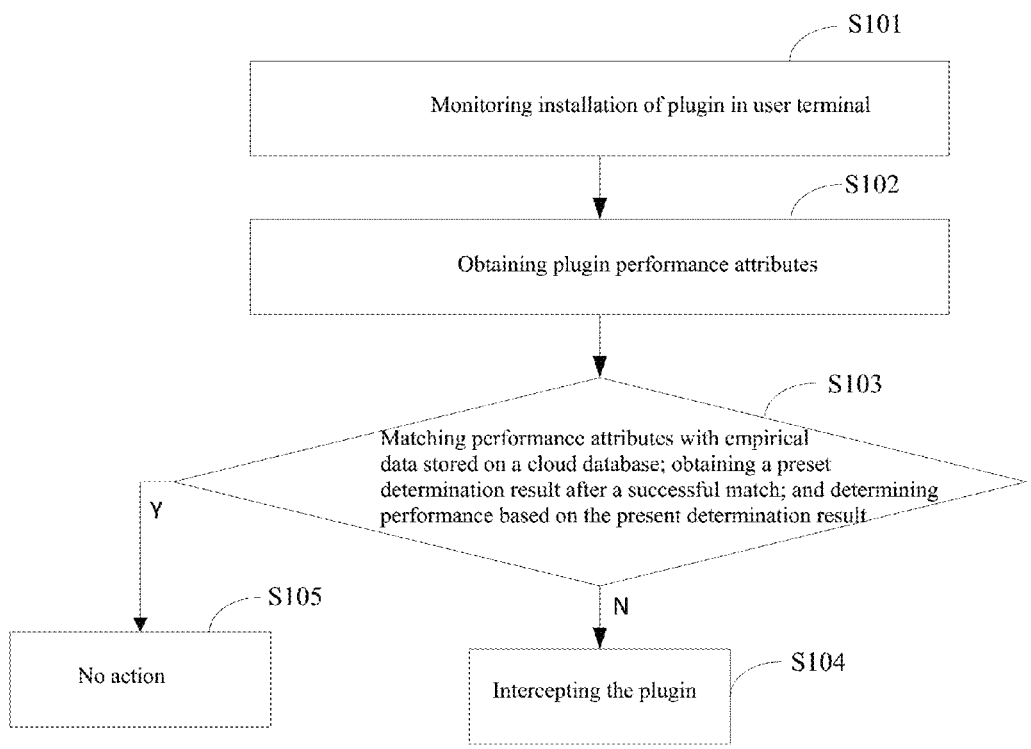
FIG. 6 is an exemplary flowchart for processing a plugin being installed in accordance with an embodiment of the present invention.

The evaluating and processing of a plugin being installed at the user terminal will be described in reference to FIG. 6. The process includes:

Step 101: monitoring the installation of a plugin at a user terminal;

Step 102: obtaining the performance attributes of the plugin;

Step 103: matching the performance attributes with empirical data stored on a cloud database; obtaining a preset determination result after a successful match, and determining whether the plugin meets the performance criterion based on the preset determination result. If the plugin does not meet the performance criterion, proceed to Step 104; if the plugin meets the performance criterion, proceed to Step 105.

Step 104: intercepting or cleaning-up the plug-in.

Step 105: no action taken.

The plugin monitoring module 201 monitors various activities at the user terminal, such as addition, deletion, or modification of entries in the registry, files, and services. The plugin monitoring module 201 generally runs in the driver layer. The plugin signature database 206 can record identifying characteristics of plugins, such as those written to specific locations of the registry, which can be used to identify the plugin. When the plugin is being installed at the user terminal, the plugin monitoring module 201 can catch such activity, and compares such activity with plugin signature database 206 to identify the plugin and obtain other information on the plugin. As a result, it can be confirmed that the monitored activity is the installation of the specific plugin.

The plugin monitoring module 201 then sends information regarding the plugin, such as the identification (ID) of the plugin, to the evaluation/determination module 202. The evaluation/determination module 202 is mainly used to obtain performance attributes of the plugin. The evaluation/determination module 202 can visit cloud empirical database 204 or local empirical database 205 to obtain performance attributes of the plugin. The evaluation/determination module 202 visits cloud empirical database 204 first to obtain performance attributes of the plugin from the server, then determines whether the plugin meets the performance criterion or directly obtains a preset result on whether the plugin meets the performance criterion. The result can be pre-obtained by backend module 207. The local empirical database 205 is a backup when there is no network connection, or when the network connection is poor and the cloud empirical database 204 cannot be connected. In accordance with this embodiment, the present result on whether the plugin meets the performance criterion can be located on the server, and be updated when data on the server data is being updated. The present result can also be located at the client, and be updated through replacement of the relevant files.

Whether the plugin meets the performance criterion is determined not only based on the loading time of the plugin, or any other individual data, but can also be based on a variety of factors, such as combining the loading time with end user review.

Figure 7:
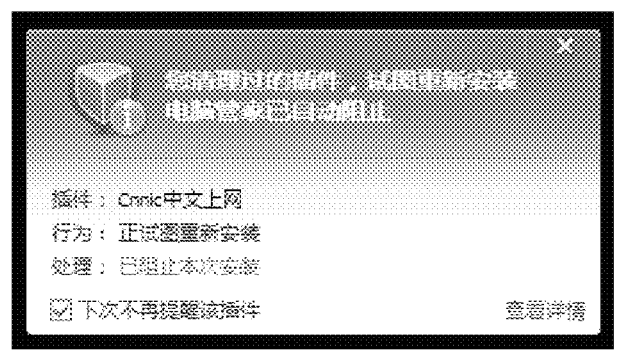
FIG. 7 is an exemplary schematic diagram for an interface for intercepting a plugin being installed in accordance with an embodiment of the present invention.

Plugin can be installed as regular software, such as through a plugin installation package, or can be installed while other software is being installed. When a plugin is being installed, if it is determined that the plugin does not meet the performance criterion, the plugin can be intercepted by the plugin processing module 203 as shown in FIG. 7. The interception user interface can be a popup window shown in FIG. 7. If the plugin meets the performance criterion, no action will be taken.

Figure 8:
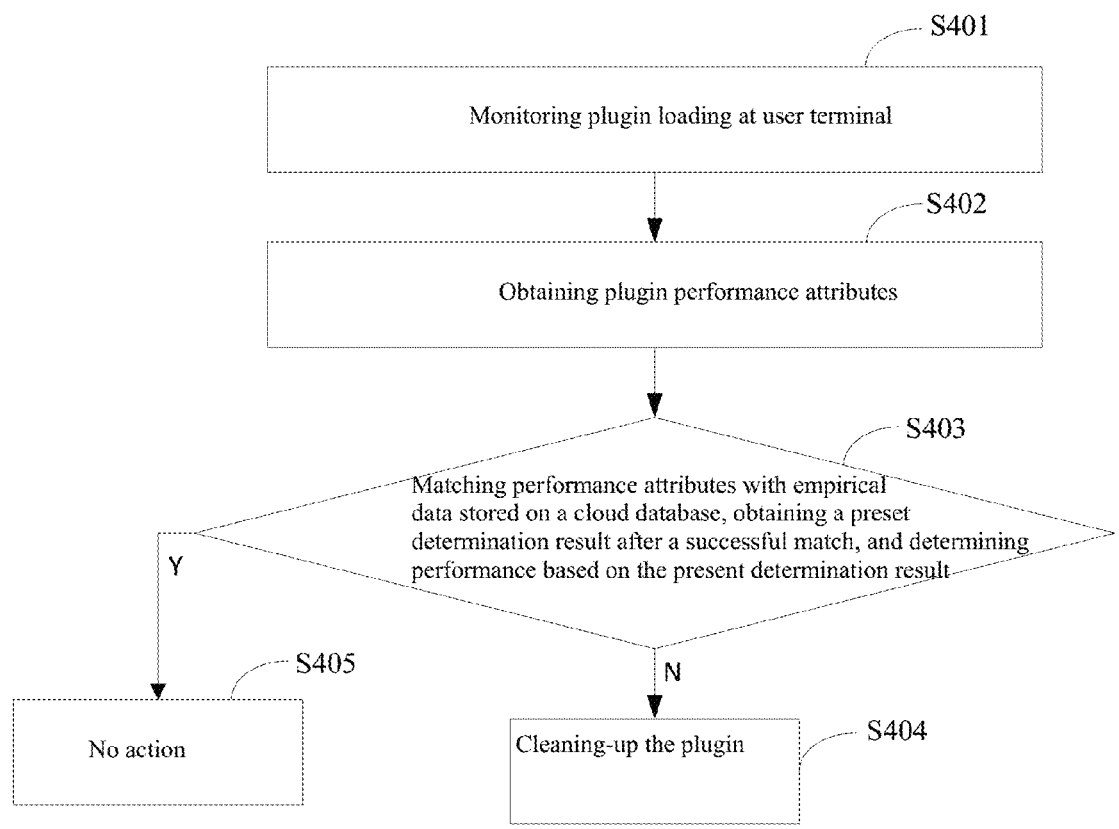
FIG. 8 is an exemplary flowchart for processing a plugin being loaded in accordance with an embodiment of the present invention.
Figure 9:
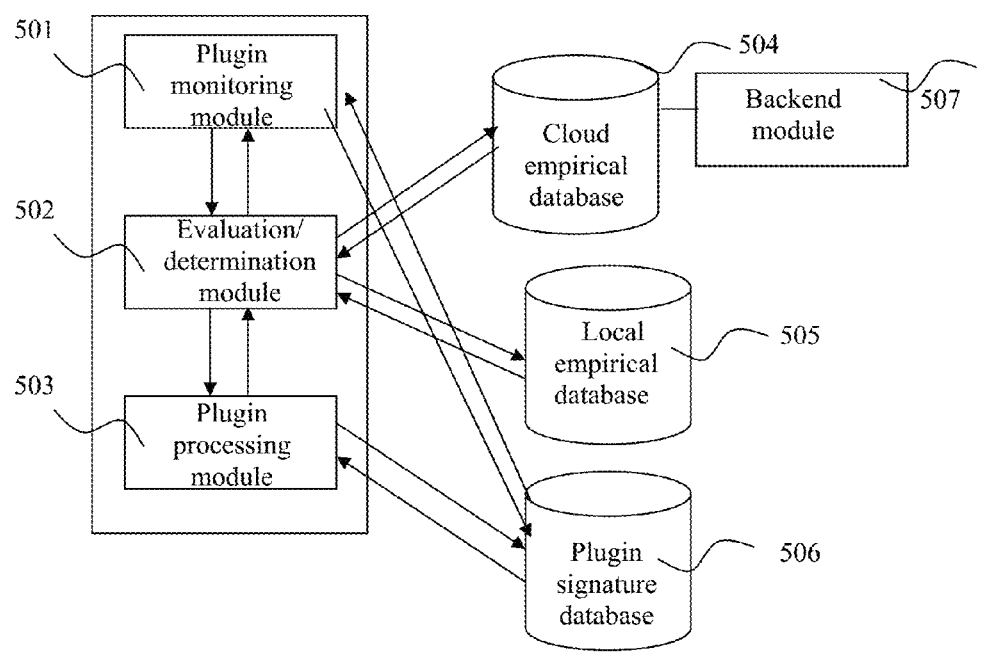
FIG. 9 is an exemplary schematic diagram for relevant components for processing a plugin being loaded in accordance with an embodiment of the present invention.

The evaluation and processing of plugin being loaded at the user terminal will be described in reference to FIGS. 8 and 9. The process includes:

Step 401: monitoring the loading of a plugin at a user terminal;

Step 402: obtaining the performance attributes of the plugin;

Step 403: matching the performance attributes with empirical data stored on a cloud database; obtaining a preset determination result after a successful match, and determining whether the plugin meets the performance criterion based on the preset determination result. If the plugin does not meet the performance criterion, proceed to Step 404; if the plugin meets the performance criterion, proceed to Step 405.

Step 404: cleaning-up the plug-in.

Step 405: no action taken.

For plugin that has already been installed, the plugin monitoring module 501 can catch the plugin when it is being loaded at the user terminal, and sends to evaluation/determination module 502. The evaluation/determination module 502 can visit cloud empirical database 504 or local empirical database 505 to obtain performance attributes of the plugin. The data in the cloud empirical database 504 is acquired through the backend module 507. The performance attributes will be matched with empirical data. If a match is successfully found, a preset determination result is obtained, and whether the plugin meets the performance criterion is determined based on the preset determination result. If the plugin does not meet the performance criterion, prohibit the loading of the plugin if permitted by the user terminal, and process the plugin using plugin processing module 503 if permitted by the user terminal. If the plugin meets the performance criterion, no action will be taken. During the removal of the plugin, identifying characteristics of the plugin should be obtained from the plugin signature database 505.

Figure 10:
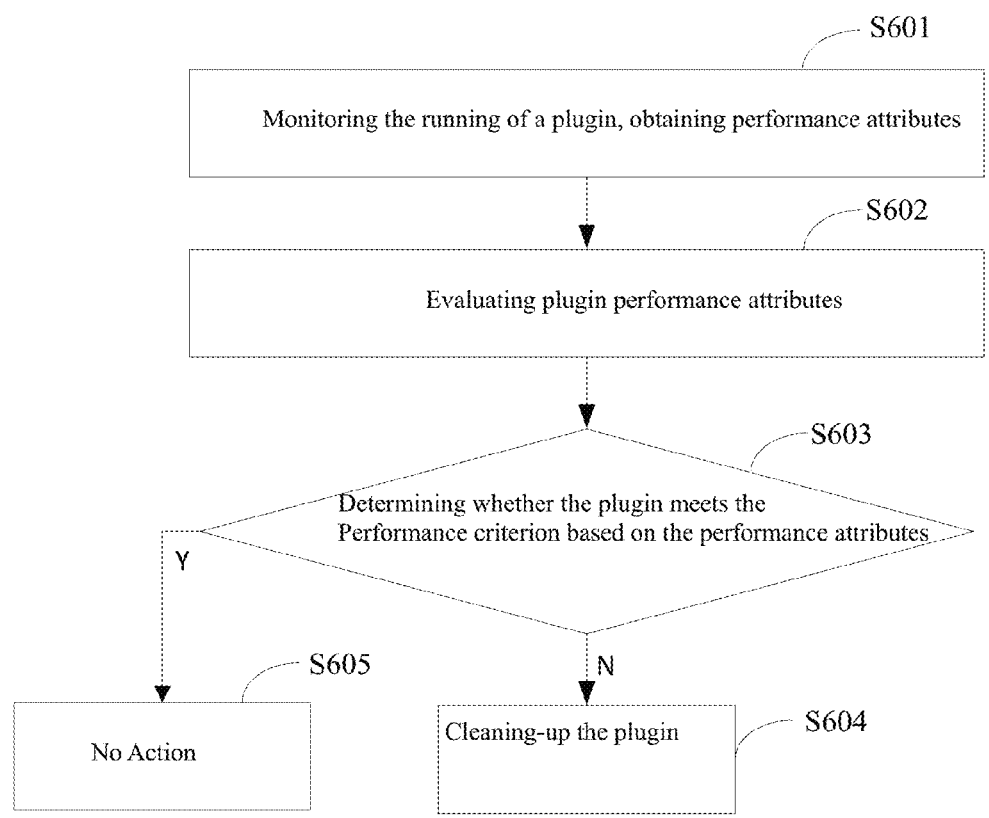
FIG. 10 is an exemplary flowchart for processing a running plugin in accordance with an embodiment of the present invention.
Figure 11:
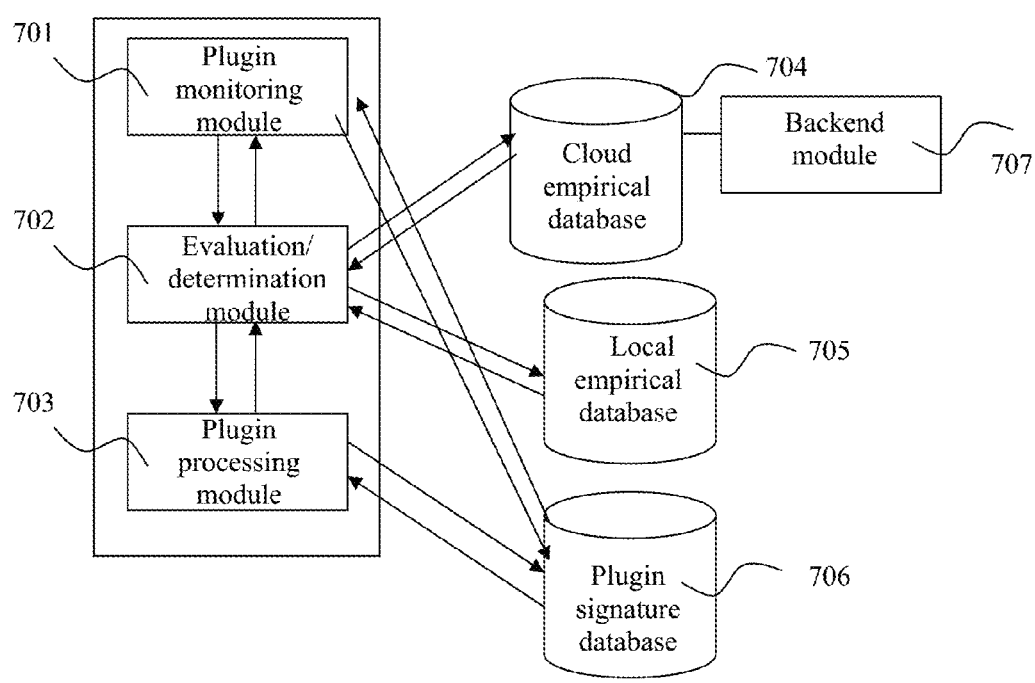
FIG. 11 is an exemplary schematic diagram for relevant components for processing a running plugin in accordance with an embodiment of the present invention.

The evaluation and processing of plugin running at the user terminal will be described in reference to FIGS. 10 and 11. The process includes:

Step 601: monitoring the running of a plugin at a user terminal, obtaining performance attributes of the plugin;

Step 602: evaluate the performance attributes of the plugin;

Step 603: determining whether the plugin meets the performance criterion based on the performance attributes. If the plugin does not meet the performance criterion, proceed to Step 604; if the plugin meets the performance criterion, proceed to Step 605.

Step 604: cleaning-up the plug-in.

Step 605: no action taken.

A running plugin may have passed the testing during its loading, or its performance attributes might not been collected by the cloud empirical database 704 to local empirical database 705 through the backend module 707. Thus, the plugin monitor module 701 can be used to catch the plugin, and send it to the evaluation/determination module 702 to obtain the performance attribute of the plugin. It can also test the performance of the plugin in real time if needed, and derive a determination result. If the plugin does not meet the performance criterion, clean-up the plugin using plugin processing module 703 if permitted by the user terminal. If the plugin meets the performance criterion, no action will be taken. During the cleanup of the plugin, identifying characteristics of the plugin should be obtained from the plugin signature database 706. If the performance attributes of the plugin has already be collected, the plugin can be processed in similar fashion discussed above when it is being installed or loaded.

Figure 12:
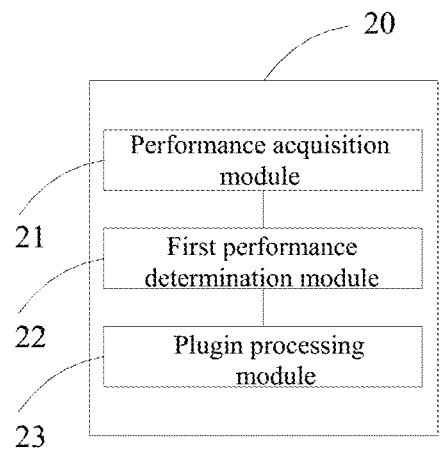
FIG. 12 is an exemplary schematic diagram for an apparatus for intercepting or cleaning-up plugins in accordance with an embodiment of the present invention.

FIG. 12 is an exemplary schematic diagram for an apparatus for intercepting or cleaning-up plugins in accordance with an embodiment of the present invention. As shown in FIG. 12, the apparatus 20 includes a performance acquisition module 21, a first performance determination module 22, and a plugin processing module 23. The performance acquisition module 21 is used for obtaining performance attributes of a plugin; the first performance determination module 22 is sued for determining whether the plugin meets a performance criterion based on the performance attributes and empirical data; and the plugin processing module 23 is used for intercepting or cleaning-up the plugin if the plugin does not meet the performance criterion.

In accordance with the apparatus 20 for intercepting or cleaning-up a plugin, the performance attributes of a plugin can be evaluated to determine whether the plugin meets a preset performance criterion, and the plugin can then be processed according to the result of the determination. This embodiment of the present invention is primarily directed to evaluating and processing plugins that are being installed, loaded, or running: if the plugin does meet the performance criterion, it will be intercepted if being installed, and cleaned-up if being loaded or running; if the plugin meets the performance criterion, no action is taken.

Figure 13:
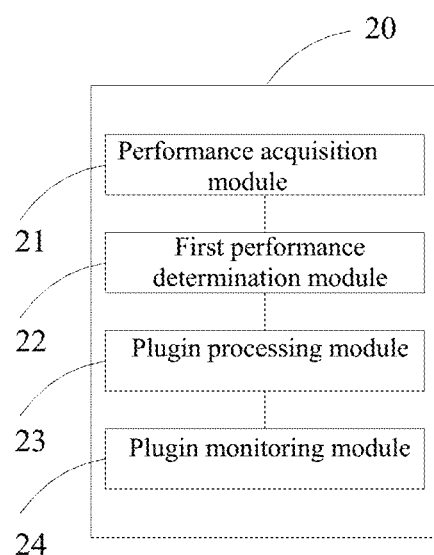
FIG. 13 is an exemplary schematic diagram for an apparatus for intercepting or cleaning-up plugins in accordance with another embodiment of the present invention.

FIG. 13 is an exemplary schematic diagram for an apparatus for intercepting or cleaning-up plugins in accordance with another embodiment of the present invention. As shown in FIG. 13, the apparatus 20 can further include a plugin monitoring module 24 for monitoring activity of the plugin in a user terminal, wherein the activity is selected from a group comprising installing, loading, and running of the plugin; identifying the plugin based on the monitored activity; and obtaining performance attributes of the plugin when the plugin is identified.

Figure 14:
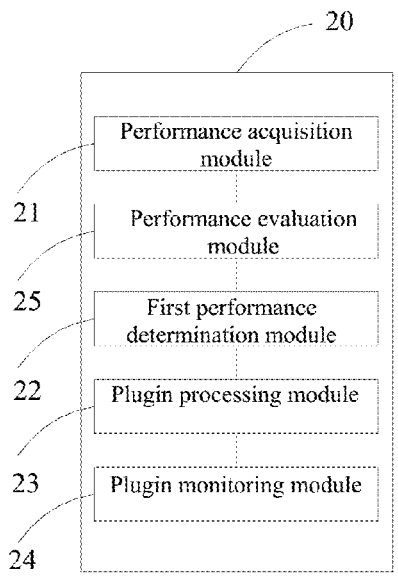
FIG. 14 is an exemplary schematic diagram for an apparatus for intercepting or cleaning-up plugins in accordance with yet another embodiment of the present invention.

FIG. 14 is an exemplary schematic diagram for an apparatus for intercepting or cleaning-up plugins in accordance with yet another embodiment of the present invention. As shown in FIG. 14, the apparatus 20 can further include a performance evaluation module 25 for, after the plugin is not identified, evaluating performance attributes of the plugin; wherein the first performance determination module 22 is configured for determining whether the plugin meets a performance criterion based on the performance attributes and empirical data; and the plugin processing module 23 is configured for intercepting or cleaning-up the plugin if the plugin does not meet the performance criterion.

As shown in FIG. 4, the empirical data can be obtained through plugin testing, backend collection, and/or web crawling, backend collection comprises frontend collection and end user review, frontend collection comprises hook mode and notification mode, the empirical data is stored in a remote cloud database or a local database.

Figure 15:
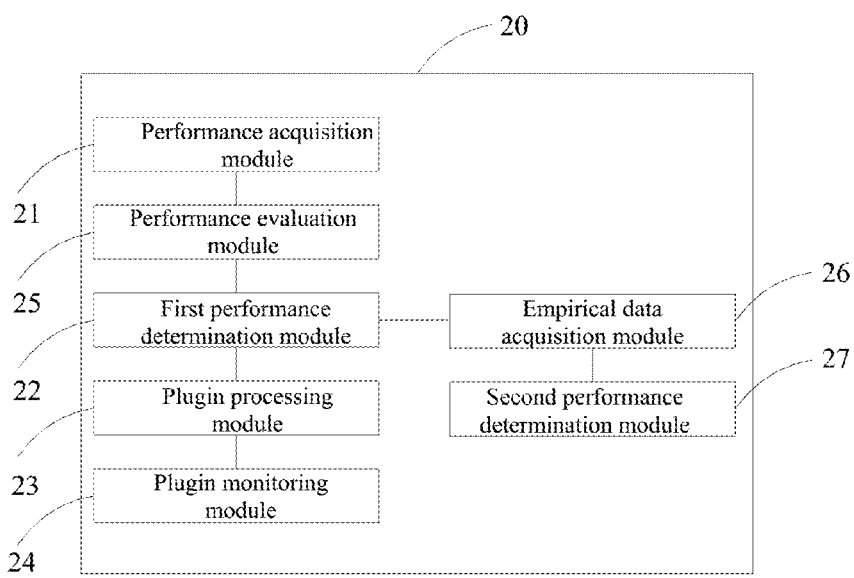
FIG. 15 is another exemplary schematic diagram for an apparatus for intercepting or cleaning-up plugins in accordance with an embodiment of the present invention.

FIG. 15 is another exemplary schematic diagram for an apparatus for intercepting or cleaning-up plugins in accordance with an embodiment of the present invention. As shown in FIG. 15, the apparatus 20 can further include an empirical data acquisition module 26 and a second performance determination module 28; the empirical data acquisition module 26 is used for obtaining empirical data of the plugin, wherein the empirical data comprises plugin importance data, plugin performance data, and/or end user review data. The second performance determination module 28 is used for determining whether the plugin meets a performance criterion based on the empirical data.

As shown in FIG. 5, the apparatus 20 for intercepting or cleaning-up a plugin can be implemented in a client and a server, and the client can include a performance acquisition module 201, a evaluation/determination module 202 and a plugin processing module 203. The apparatus can also be implemented in a plugin signature database 206 and a local empirical database 205. The server can include backend module 207. The method can also be implemented in cloud empirical data database 204. The performance acquisition module 201, evaluation/determination module 202 and plugin processing module 203 generally can be one or several independent installation files based on the needs, and whose functionalities can be implemented as either Dynamic Link Library (DLL) or Label Information Base (LIB).

In this embodiment, the performance acquisition module 24 is equivalent to the performance acquisition module 201 in FIG. 5, the performance acquisition module 21, the first performance determination module 22 and performance evaluation module 25 are equivalent to evaluation/determination module 202 in FIG. 5; the plugin processing module 23 is equivalent to plugin processing module 203; the empirical data acquisition module 26 and the second performance determination module 28 are equivalent to backend module 207 in FIG. 5.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for intercepting or cleaning-up a plugin, implemented by a user terminal including at least one processor and a storage medium, the method comprising:
    monitoring activity of a plugin on the user terminal, wherein the monitored activity includes installing, loading, and running of the plugin;
    identifying the plugin by comparing the monitored activity with plugin characteristics in a plugin signature database located in the storage medium of the user terminal;
    when the plugin is identified, obtaining performance attributes of the plugin from a local empirical database located in the storage medium of the user terminal or a cloud empirical database located at a server, the server being configured to store data and communicate with the user terminal over a network;
    when the plugin is not identified, evaluating performance attributes of the plugin by the user terminal;
    determining whether the plugin meets a performance criterion based on the performance attributes; and
    intercepting or cleaning-up the plugin on the user terminal if the plugin does not meet the performance criterion.

2. The method of claim 1, further comprising,
    obtaining, by the local empirical database or the cloud empirical database, empirical data of the plugin, wherein the empirical data comprises plugin importance data, plugin performance data, and end user review data; and
    determining whether the plugin meets the performance criterion based on the empirical data.

3. The method of claim 2, wherein the end user review data includes one or more end user reviews on performance of the plugin collected from one or more end users using the plugin on one or more client terminals.

4. The method of claim 2, wherein the plugin performance data includes information on a CPU usage, a load time, and a memory usage of the plugin.

5. The method of claim 4, wherein the plugin performance data is obtained through an automated plugin testing procedure.

6. The method of claim 4, wherein the plugin performance data is obtained through a frontend collection process implemented by a client terminal having at least one processor, the frontend collection process including collecting hardware environment and software environment of the client terminal and sending the collected information to the server.

7. The method of claim 6, wherein the frontend collection process includes a hook mode, comprising: using a hook to obtain a start time and an end time for loading the plugin, a start time and an end time for running the plugin, and information on the CPU usage and the memory usage while the plugin is loading and running, the hook being a system call on the client terminal.

8. The method of claim 6, wherein the frontend collection process includes a reception mode, comprising: directly notifying, by the client terminal, a start time and an end time for loading the plugin, a start time and an end time for running the plugin, and information on the CPU usage and the memory usage while the plugin is loading and running.

9. The method of claim 2, wherein the empirical data further comprises search engine data and website review data corresponding to the plugin collected by web crawling.

10. The method of claim 2, further comprising:
when the plugin importance data indicates that a necessity of the plugin meets a threshold, directly determining that the plugin meets the performance criterion.

11. The method of claim 1, wherein determining if the plugin meets a performance criterion based on the performance attributes comprises:
matching the performance attributes with empirical data stored on the cloud database;
obtaining a preset determination result after a successful match, and
determining whether the plugin meets the performance criterion based on the preset determination result.

12. The method of claim 11, further comprising:
storing the preset determination result on the server; and
updating the preset determination result when empirical data of the plugin is updated in the cloud database on the server.

13. The method of claim 1, wherein the plugin is a program written accordance to a standard application programming interface.

14. The method of claim 1, wherein when the plugin is identified, obtaining performance attributes of the plugin from a local empirical database located in the storage medium of the user terminal or a cloud empirical database located at a server further comprising:
when the user terminal has a network connection with the server, obtaining the performance attributes of the plugin from the server through the network; and
when the user terminal does not have the network connection with the server, obtaining performance attributes of the plugin from the local empirical database.

15. The method of claim 1, wherein evaluating performance attributes of the plugin includes obtaining information on a CPU usage, a load time, and a memory usage of the plugin.

16. An apparatus for intercepting or cleaning-up a plugin, the apparatus comprising at least one processor, a storage medium, and a plurality of program modules stored in the storage medium and to be executed by the at least one processor, the plurality of program modules comprising:
a plugin monitoring module for:
monitoring activity of the plugin in the apparatus, wherein the monitored activity includes installing, loading, and running of the plugin;
identifying the plugin by comparing the monitored activity with plugin characteristics in a plugin signature database located in the storage medium of the apparatus; and
when the plugin is identified, obtaining performance attributes of the plugin from a local empirical database located in the storage medium of the user terminal or a cloud empirical database located at a server, the server being configured to store data and communicate with the user terminal over a network;
a performance evaluation module for evaluating performance attributes of the plugin when the plugin is not identified by the plugin monitoring module;
a performance acquisition module for obtaining the performance attributes of the plugin from the plugin monitoring module or the performance evaluation module;
a first performance determination module for determining whether the plugin meets a performance criterion based on the performance attributes; and
a plugin processing module for intercepting or cleaning-up the plugin on the user terminal if the plugin does not meet the performance criterion.

17. The apparatus of claim 16, further comprising an empirical data acquisition module for obtaining empirical data of the plugin from the local empirical database or the cloud empirical database, wherein the empirical data comprises plugin importance data, plugin performance data, and end user review data; and
a second performance determination module for determining whether the plugin meets the performance criterion based on the empirical data.

18. The apparatus of claim 16, wherein the end user review data includes one or more end user reviews on performance of the plugin collected from one or more end users using the plugin on one or more client terminals.

19. The apparatus of claim 16, wherein the first performance determination module is further configured for:
matching the performance attributes with empirical data stored on the cloud database;
obtaining a preset determination result after a successful match, and
determining whether the plugin meets the performance criterion based on the preset determination result.

* * * * *